(12) United States Patent
Andreozzi et al.

(10) Patent No.: US 9,107,150 B2
(45) Date of Patent: Aug. 11, 2015

(54) LINK SCHEDULING ALGORITHM FOR OFDMA WIRELESS NETWORKS WITH RELAY NODES

(75) Inventors: Matteo Maria Andreozzi, Pisa (IT); Marco Caretti, Turin (IT); Roberto Fantini, Turin (IT); Daniele Migliorini, Pisa (IT); Vincenzo Maria Pii, Pisa (IT); Dario Sabella, Turin (IT); Giovanni Stea, Pisa (IT)

(73) Assignee: TELECOM ITALIA S.p.A, Milan (IT)

( * ) Notice: Subject to any disclaimer, the term of this patent is extended or adjusted under 35 U.S.C. 154(b) by 80 days.

(21) Appl. No.: 14/001,882

(22) PCT Filed: Mar. 3, 2011

(86) PCT No.: PCT/EP2011/053221
§ 371 (c)(1),
(2), (4) Date: Aug. 28, 2013

(87) PCT Pub. No.: WO2012/116754
PCT Pub. Date: Sep. 7, 2012

(65) Prior Publication Data
US 2013/0336200 A1    Dec. 19, 2013

(51) Int. Cl.
*H04W 72/04* (2009.01)
*H04W 40/22* (2009.01)
(Continued)

(52) U.S. Cl.
CPC .......... *H04W 40/22* (2013.01); *H04W 72/1226* (2013.01); *H04W 72/1252* (2013.01); *H04W 84/047* (2013.01)

(58) Field of Classification Search
CPC ............ H04W 40/22; H04W 72/1226; H04W 84/047; H04W 72/1252
See application file for complete search history.

(56) References Cited

U.S. PATENT DOCUMENTS

| 2008/0188231 A1* | 8/2008 | Zhu et al. ............. 455/450 |
| 2010/0034157 A1* | 2/2010 | Stolyar et al. ......... 370/329 |

(Continued)

FOREIGN PATENT DOCUMENTS

| JP | 2010-514231 A | 4/2010 |
| JP | 2010-141893 A | 6/2010 |

(Continued)

OTHER PUBLICATIONS

Office Action issued Jun. 20, 2014 in Japanese Patent Application No. 2013-555768 (with English language translation).

(Continued)

*Primary Examiner* — Clemence Han
(74) *Attorney, Agent, or Firm* — Oblon, McClelland, Maier & Neustadt, L.L.P.

(57) ABSTRACT

A method scheduling link activations within a wireless communications network including at least one network cell including a base station providing radio coverage over the network cell and at least one relay node putting the base station into communication with a user equipment within the network cell over an access link. The relay node communicates with the base station over a backhaul link. The method includes estimating, for the relay node, an access link capacity according to status information indicative of a status of the user equipment associated with the relay node, estimating a backhaul link capacity of the relay node according to the status information, and scheduling, for the relay node, either a backhaul link activation or an access link activation such that one of the backhaul link and access link is activated, in a predetermined time interval, based on a comparison between the access capacity and backhaul capacity.

15 Claims, 6 Drawing Sheets

Figure 1:
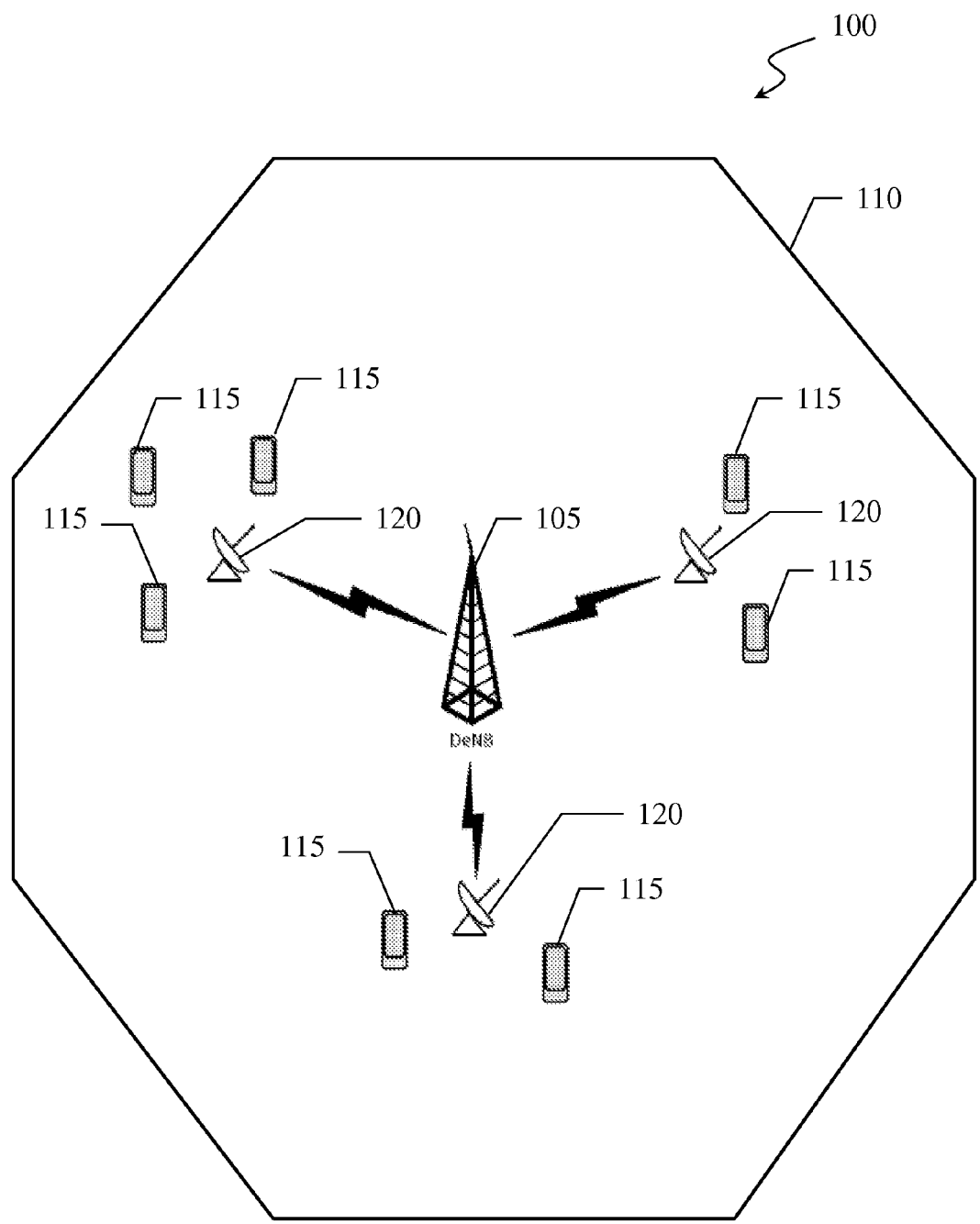

(51) Int. Cl.
  *H04W 72/12* (2009.01)
  *H04B 7/14* (2006.01)
  *H04W 84/04* (2009.01)

(56) References Cited

U.S. PATENT DOCUMENTS

| | | | |
|---|---|---|---|
| 2010/0238826 A1* | 9/2010 | Borran et al. | 370/252 |
| 2011/0128893 A1* | 6/2011 | Park et al. | 370/279 |
| 2012/0127915 A1* | 5/2012 | Moberg et al. | 370/315 |
| 2013/0012217 A1* | 1/2013 | Suda | 455/450 |
| 2013/0090055 A1* | 4/2013 | Pitakdumrongkija et al. | 455/9 |
| 2013/0090121 A1* | 4/2013 | Zhang et al. | 455/450 |

FOREIGN PATENT DOCUMENTS

| WO | WO 2008/021724 A2 | 2/2008 |
|---|---|---|
| WO | 2011 002176 | 1/2011 |

OTHER PUBLICATIONS

International Search Report Issued Oct. 27, 2010 in PCT/EP11/053221 filed Mar. 3, 2011.

* cited by examiner

LINK SCHEDULING ALGORITHM FOR OFDMA WIRELESS NETWORKS WITH RELAY NODES

BACKGROUND OF THE INVENTION

1. Field of the Invention

The present invention generally relates to wireless communications networks, such as cellular networks. More particularly, the present invention relates to wireless communication networks comprising relay nodes, generally intended to increase network capacity and extend radio coverage.

2. Overview of the Related Art

Evolution of wireless communication networks has experimented a significant growth in terms of spread and performance, and has recently brought to 3GPP LTE-Advanced ("Third Generation Partnership Project Long Term Evolution Advanced") standard, which represents a major advance in cellular technology, as being designed to meet needs for high-speed data and media transport as well as high-quality voice and video communications support into the next decade.

More particularly, the 3GPP LTE-Advanced is a standard capable of conveying data between a fixed-location transceiver radiating electromagnetic or radio waves over a respective land area called network cell (which is delimited by electromagnetic radiating power of the of radio wave itself, and often drawn as a hexagon for convention), and typically referred to as Donor eNodeB (DeNB), and User Equipments (UEs, e.g., user terminals, such as cellular phones) within the network cell.

As known, the 3GPP LTE-Advanced employs some advanced technologies, such as Orthogonal Frequency Division Multiplexing (OFDM) or Multiple Input Multiple Output (MIMO) signal transmission technique. As far as 3GPP LTE-Advanced incorporating OFDM technology is concerned, to which reference will be made in the following by way of example only, and wherein downlink access scheme, based on OFDMA—Orthogonal Frequency Division Multiple Access—, differs from uplink access scheme, based on SC-FDMA—Single Carrier Frequency Division Multiple Access—, the need of developing solutions for providing improved user experience while reducing infrastructure costs has brought to the deployment, within the network cells, of one or more relay nodes (or simply relays) each one generally associated with, and supporting, the DeNB of the corresponding network cell.

In general terms, relay nodes ensure coverage extension of the network cells in which they are used, as well as deployment costs reduction of the same, and may enhance the capacity of the network cell and the effective throughput thereof.

More particularly, the operation of the relay nodes within a given network cell is such that the DeNB of the cell communicates with a UE of a subscriber that at that time requires a service in the same network cell (e.g., voice call) through a selected relay node (for example, the one relay node within the cell that is closest to the UE), thereby possibly allowing the UE to be better served via a two-hop path than a single-hop one (thus overcoming, for instance, possible quality degradation of the transmission channel).

Quality degradation of the transmission channel is a relatively frequent occurrence happening when obstructions are present between the DeNB and the user equipment of the subscriber—as those experienced in the presence of physical barriers (e.g., high shadowing environments, such as indoor locations), or interference signals (for instance, radio frequency signals)—, or in case of an excessive distance therebetween, e.g. as a consequence of a restricted radio coverage with respect to the radio coverage theoretically provided by the DeNB. In fact, accounting all gains and losses between the DeNB and the user equipment, a generic user equipment that is located at cell boundaries could experience poor radio channel conditions, and thus it may often be incapable of communicating at all or by making use of reasonably high data rates.

As it is known, access sub-frames and backhaul sub-frames are used for transmission purposes in the presence of relay nodes. More specifically, the access sub-frames are sent over a set of mutually non-interfering wireless access communication links (in both directions, i.e., downlink and uplink), henceforth access links, for interconnecting the relay nodes to the UEs associated thereto, whereas the backhaul sub-frame is sent over the (single) shared wireless backhaul communication link (in both directions, i.e., downlink and uplink), henceforth backhaul links, through which all the relay nodes communicate with the DeNB.

The backhaul sub-frame is scheduled by the DeNB, which selects which relays transmit (in uplink) or receive (in downlink), and on which radio resources, whereas the access sub-frames are scheduled by each relay node, that selects which UEs can transmit/receive and on which radio resources. Hereafter, it will be exemplary assumed (for ease of explanation) that UEs can only be associated to relays nodes.

Being unable to perform reception and transmission operations at the same time using the same frequencies, which would result in strong interference, relay nodes are physically subject to the constraint of having to activate the access link and the backhaul link over separate radio resources. Such physical limitation, frequently referred to as "relay duplexing problem", requires that access and backhaul link activations be scheduled so as to avoid time-frequency overlapping that could generate high interference levels. In this respect, two different approaches are possible, namely radio resources separation in either the frequency domain (FDD relaying) or the time domain (TDD relaying).

In the FDD relaying approach, access and backhaul sub-frames can be scheduled simultaneously, since signals transmission and reception are carried out using two different frequency intervals. In the TDD relaying approach, instead, access and backhaul sub-frames are assigned to separate time resources with the full frequency spectrum available for each one of them. In this way, both the transmitter and the receiver can operate on a same single frequency, but allocating different time slots for transmission and reception (i.e., transmission and reception signals share the same full frequency spectrum channel, and are spaced apart by multiplexing them on a time basis).

As TDD relaying may better exploit frequency diversity than FDD relaying (due to its using the full spectrum), the former has been deemed as best suited for traffic applications such as Internet or other services. For this reason, the TDD relaying approach has been acknowledged by the present LTE Advanced standard release 10, and to it reference will be exemplarily made in the rest of this document.

In a TDD relaying approach, the decisions of activating, for each relay node, the access links or the backhaul link (referred to as duplexing decision or link scheduling decision in the following) are updated every predetermined time interval, also referred to as duplexing pattern refresh interval (or simply refresh interval), whereas, regardless of the time extension of such refresh interval, the radio resources are allocated within data sub-frames, each one having a time extension of 1 TTI (Transmission Time Interval).

In particular, according to a semi-static link scheduling approach, the duplexing decisions of whether to activate (the uplink and downlink of) the access link or of the backhaul link of a determined relay node are taken at longer time intervals (typically, with the refresh interval of the order of ten TTI), since the frame patterns, communicated through RRC (Radio Resource Control) level signaling, decide in which subframes the backhaul link and the access links are activated, whereas in a dynamic link scheduling approach the link scheduling decisions are taken at each sub-frame (with the refresh interval that is equal to 1 TTI).

In the state of the art, solutions are known that provide for link scheduling schemes.

In deliverable D 3.5.3 "Final assessment of relaying concepts for all CGs scenarios under consideration of related WINNER L1 and L2 protocol functions" of WINNER II IST-4-027756 project, 2007, it is shown that the relay solution outperforms the base-stations-only deployment. The relay concept is also applied to some different topological scenarios and it is shown that relay nodes are a cost-effective solution, which provide a high service level. Moreover the FDD and TDD schemes are presented as possible radio resource partitioning solutions.

In R. Schoenen, W. Zirwas, and B. Walke, "Capacity and coverage analysis of a 3GPP-LTE multihop deployment scenario," in Communications Workshops, 2008. ICC Workshops 08. IEEE International Conference on, pp. 31-36, IEEE, May 2008, the relay performance for coverage and capacity is analyzed in a real urban scenario. The document shows the benefits of relay deployment to extend the cell coverage and increase the spectral efficiency.

In R. Schoenen, R. Halfmann, and B. H. Walke, "An FDD Multihop Cellular Network for 3GPP-LTE," VTC Spring 2008—IEEE Vehicular Technology Conference, pp. 1990-1994, May 2008, the authors present a performance analysis for relay nodes, for both coverage and capacity, using the TDD scheme. More particularly a pattern for link scheduling which alternates access and backhaul transmissions is defined. Odd sub-frames are dedicated to "hop-1" (i.e., directly connected to the DeNB) users and the relay nodes, while even sub-frames are dedicated to "hop-2" users, i.e., those connected to the relay nodes.

In M. Kaneko and P. Popovski, "Radio resource allocation algorithm for relay-aided cellular OFDMA system," in ICC'07. IEEE International Conference on Communications, 2007, pp. 4831-4836, IEEE, 2007, the authors propose a Max C/I-based resource scheduling algorithm for a relay enhanced cell with the OFDMA technology. The access and backhaul interleaving is initially as in the previous cited solution, thus the access and backhaul links are alternated: one sub-frame for the backhaul and one sub-frame for the access. A time adaptation algorithm is then introduced: one sub-frame is subtracted from the backhaul and assigned to the access (or vice versa) if this choice produces a throughput increment. The performance of the proposed algorithm is then compared with that of a (theoretical, but unimplementable) upper bound algorithm.

In W. Nam, W. Chang, S. Chung, and Y. Lee, "Transmit optimization for relay-based cellular OFDMA systems," in ICC'07. IEEE International Conference on Communications, 2007, pp. 5714-5719, IEEE, 2007, two resource allocations problems are formulated for an OFDMA system with relay nodes. The first one uses a fixed power assignment for each subcarrier, the second one proposes a joint power and subcarrier allocation. The interleaving of access and backhaul is the same as in R. Schoenen, R. Halfmann, and B. H. Walke solution, with alternating frames assigned to base stations and relay nodes.

In C.-Y. Hong, A.-C. Pang, and P.-C. Hsiu, "Approximation algorithms for a link scheduling problem in wireless relay networks with QoS guarantee", IEEE Transactions on Mobile Computing, vol. 9, pp. 1732-1748, 2010, a scheduling algorithm for bandwidth and delay guarantee is investigated in a wireless network using relay. The scheduling algorithm operates on a frame-by-frame basis and it is designed to support Quality of Service (QoS) and real-time services. The proposed algorithm provides a schedule assignment for traffic flows by determining the frame in which the transmission of a subset of flows should occur. This is done by ordering the traffic flows using an EDD (Earliest Due Date) rule.

SUMMARY OF INVENTION

The Applicant has recognized that in most of the above-referenced works a link scheduling which depends on the dynamic conditions of the network is not taken into account.

Moreover, the Applicant identifies that, although in M. Kaneko and P. Popovski work a link scheduling algorithm taking into account the dynamic conditions of the network is actually proposed, it considers only one relay node, and selects whether to activate its backhaul link or its access link.

Generally speaking, regardless of the time resolution at which link scheduling decisions are made, i.e., whether at each sub-frame (for the dynamic link scheduling approach), or group thereof, (for the semi-static link scheduling approach), the Applicant has recognized that a known critical aspect substantially common to both such approaches relates to the sub-frame on the backhaul link (or backhaul sub-frame for the sake of simplicity), and that effectively managing the backhaul sub-frame could lead to a considerably improved network cell throughput.

More specifically, the Applicant believes that the backhaul sub-frame represents a relevant system bottleneck, as it is a single, shared sub-frame that must carry all transmissions coming from (in the uplink direction) or directed to (in the downlink direction) the multiple, dedicated access links between each relay node and all UEs connected to it. In fact, in general the capacity required along the backhaul path may be potentially larger than the maximum capacity of the backhaul link (just because each relay node connected to the DeNB can serve a plurality of UEs connected thereto). For this reasons, activating the backhaul link for all the relay nodes (or even for some of them), thereby preventing them from activating their respective access links, could be a disadvantageous choice, as it would unduly increase competition on the backhaul link while leaving potential capacity in all or some access links unexploited. This would decrease the overall throughput of the cell.

Hereafter we generically call capacity the maximum amount of data that can be transmitted in a sub-frame, depending on the radio channel conditions between transmitters and receivers, and on the amount of data available at the transmitters. For instance, in the uplink direction of the access link, the capacity is computed as the maximum amount of data that can be fitted in the uplink access sub-frame, given the available radio resources in the latter, the modulation and coding scheme that each UE is going to use, and the amount of data buffered at the UEs.

As an example of ineffective exploitation of the radio resources in a wireless communication network of the type above described, and with reference to the uplink direction, the following scenario will be considered: a relay is activated in the backhaul link (thereby preventing transmission on its access link, due to the relay duplexing problem) when possibly experiencing a temporarily poor radio channel condition on the backhaul link itself. This being the case, the relay only transmits few data on its radio resources. At the same time the same relay has a large access link capacity (or access capacity), due to many of its associated UEs having a large amount of data and good radio channel conditions on that relay's access link. Clearly, the global network throughput would be larger if the access link (instead of the backhaul link) had been scheduled at that time for that relay, as a consequence of a smarter link scheduling decision.

As another example, possibly a direct consequence of the previous one, resources on the backhaul sub-frame could be no longer available for another relay node, which could then be forced to remain idle, being unable to activate its access link once the link scheduling decision has been made.

In view of the above, the Applicant has tackled the problem of devising a solution suitable to provide a new simple and effective link scheduling algorithm that, making link scheduling decisions on a per-relay node basis (assuming a plurality of relay nodes), avoids the above undesired scenarios as well as other undesirable conditions possibly connected to inadequate link scheduling decisions. Generally, this is achieved by identifying those relay nodes for which activating the backhaul (respectively: the access) link(s) is beneficial from a throughput perspective.

One or more aspects of the solution according to specific embodiments of the invention are set out in the independent claims, with advantageous features of the same solution that are indicated in the dependent claims, whose wording is enclosed herein verbatim by reference (with any advantageous feature being provided with reference to a specific aspect of the solution according to an embodiment of the invention that applies mutatis mutandis to any other aspect).

More specifically, the solution according to one or more embodiments of the present invention relates to a method for scheduling link activations within a wireless communications network including at least one network cell. The at least one network cell comprises a base station providing radio coverage over the network cell and at least one relay node for putting into communication the base station with at least one corresponding user equipment within the network cell. Said at least one relay node communicates with the user equipment over an access link and with the base station over a backhaul link. The method includes estimating, for the at least one relay node, an access link capacity according to status information indicative of a status of the user equipment associated with the relay node, estimating a backhaul link capacity of the at least one relay node according to the status information, and scheduling, for the at least one relay node, either a backhaul link activation or an access link activation such that either one of the backhaul link and the access link is activated, in a predetermined time interval, based on a comparison between the access capacity and the backhaul capacity.

Conveniently, the phase of estimating, for the at least one relay node, an access link capacity may comprise virtually assigning, on the access link, physical resource blocks to the at least one user equipment associated with the relay node, and iterating said virtually assigning on the access link for each physical resource block to be assigned. Said virtually assigning on the access link may comprise for each iteration the steps of calculating, for the at least one user equipment, a block usage capacity parameter indicative of the capability of the considered user equipment to use a given physical resource block assigned thereto, in case more than one user equipments are associated with the relay node, selecting the user equipment having maximum block usage capacity parameter, limiting the block usage capacity parameter of the selected user equipment to an available relay node queue space, thereby obtaining a limited block usage capacity parameter being lower than, or equal to, the block usage capacity parameter of the selected user equipment, assigning the physical resource block to the selected user equipment, and updating the access link capacity of the relay node according to the assigned physical resource block.

For each iteration successive to the first one, the access link capacity of the at least one relay node is given by the access link capacity updated during a last iteration of said virtually assigning physical resource blocks on the access link.

Advantageously, the phase of estimating the backhaul link capacity of the at least one relay node may further comprise virtually assigning on the backhaul link physical block resources of the at least one relay node, and, in case more than one relay node is present, said virtually assigning on the backhaul link can be iterated on each relay node until all physical resource blocks have been virtually assigned to relay nodes or until all the relay nodes have been considered. Each iteration may include:

evaluating backhaul-capable relay nodes as relay nodes that would be capable of achieving a backhaul link capacity higher than the respective access link capacity;

calculating, for each given backhaul-capable relay node, a score parameter indicative of the advantage deriving from allocating currently available physical resource blocks to said given backhaul-capable relay node with respect to another backhaul-capable relay node;

selecting the backhaul-capable relay node having the greatest score parameter and virtually assigning required physical resource blocks to said selected backhaul-capable relay node, said required physical resource blocks representing the amount of physical resource blocks able to achieve a maximum capacity for that selected backhaul-capable relay node;

obtaining the backhaul link capacity of the selected backhaul capable relay node based on the assigned required physical resource blocks, the backhaul-capable relay node selected at a given iteration being no longer taken into account in the successive iterations.

Advantageously, the step of evaluating backhaul-capable relay nodes may further include, for each relay node, calculating the maximum capacity as the capacity that would be obtained by assigning to the relay node all remaining physical resource blocks, calculating a gain as a difference between the maximum capacity of the relay node and the respective access link capacity, and evaluating as backhaul-capable relay nodes those relay nodes whose gain is non negative.

The phase of virtually assigning on the backhaul link further may optionally include, after obtaining the backhaul link capacity of the selected backhaul-capable relay node, updating a value of the remaining physical resource blocks by subtracting from it a value corresponding to the assigned required physical resource block, and revoking the last assigned required physical resource block from the corresponding selected backhaul-capable relay node if, even without it, the condition of having the backhaul link capacity higher than the access link capacity is still verified for the relay node.

Such step of calculating backhaul link capacity of each backhaul-capable relay node may further include, after completing said virtually assigning on the backhaul link, evaluating the presence of revoked physical resource blocks, and assigning the revoked physical resource blocks to the backhaul-capable relay nodes from which the required physical resource blocks were revoked.

In a preferred embodiment, the score parameter for each backhaul-capable relay node is obtained by dividing the gain by the required physical resource blocks necessary for obtaining it.

The phase of scheduling, for the relay node, either the backhaul link activation or the access link activation preferably further comprises comparing the backhaul link capacity to the access link capacity of the relay node, scheduling the backhaul link activation if the backhaul link capacity is greater than the access link capacity, or viceversa.

The block usage capacity parameter for the at least one user equipment is conveniently calculated as the minimum between a channel quality parameter and a buffer status information.

The step of evaluating backhaul-capable relay nodes may further include considering the buffer status parameter and the access link capacity of the at least one relay node, calculating, for the at least one relay node, the maximum relay node capacity as the minimum between the buffer status parameter and the product of the channel quality parameter and the remaining physical resource blocks, and calculating the gain of the at least one relay node as difference between the maximum capacity of the relay node and the access link capacity for the relay node.

In a possible implementation, the access link capacity can be an uplink access link capacity. In such case, said channel quality parameter is an uplink channel quality parameter denoting the uplink channel quality evaluated by the relay node in respect of the at least one user equipment associated therewith and by the base station in respect of the relay node, the buffer status information is a buffer status report information, and the status information includes the uplink channel quality parameter, the buffer status report information and a relay node available queue space parameter.

Additionally or alternatively, the access link capacity is a downlink access link capacity. In such case, said channel quality parameter is a feedback downlink channel quality parameter denoting the downlink channel quality, the status information includes the downlink channel quality parameter and a downlink queues length information, and the access link capacity is calculated by using the downlink channel quality parameters for the access links and downlink queues length information on the at least one relay node.

Another aspect of the solution according to an embodiment of the present invention relates to a corresponding wireless communications network.

Another aspect of the solution according to an embodiment of the present invention relates to a wireless communications network.

The present invention is such that each relay is activated on the link (whether backhaul or access) that allows the highest amount of data to be transmitted, taking into account the amount of data queued at each point in the network, the state of the radio channels, the available queue space at the relays, and the amount of radio resources on the backhaul and access sub-frames.

Moreover, the link scheduling algorithm of the present invention allows both dynamic and semi-static link scheduling decisions to be implemented, which makes the algorithm suitable for different applications of the LTE-advanced standard, or also for other communications standards.

BRIEF DESCRIPTION OF THE ANNEXED DRAWINGS

Figure 2:
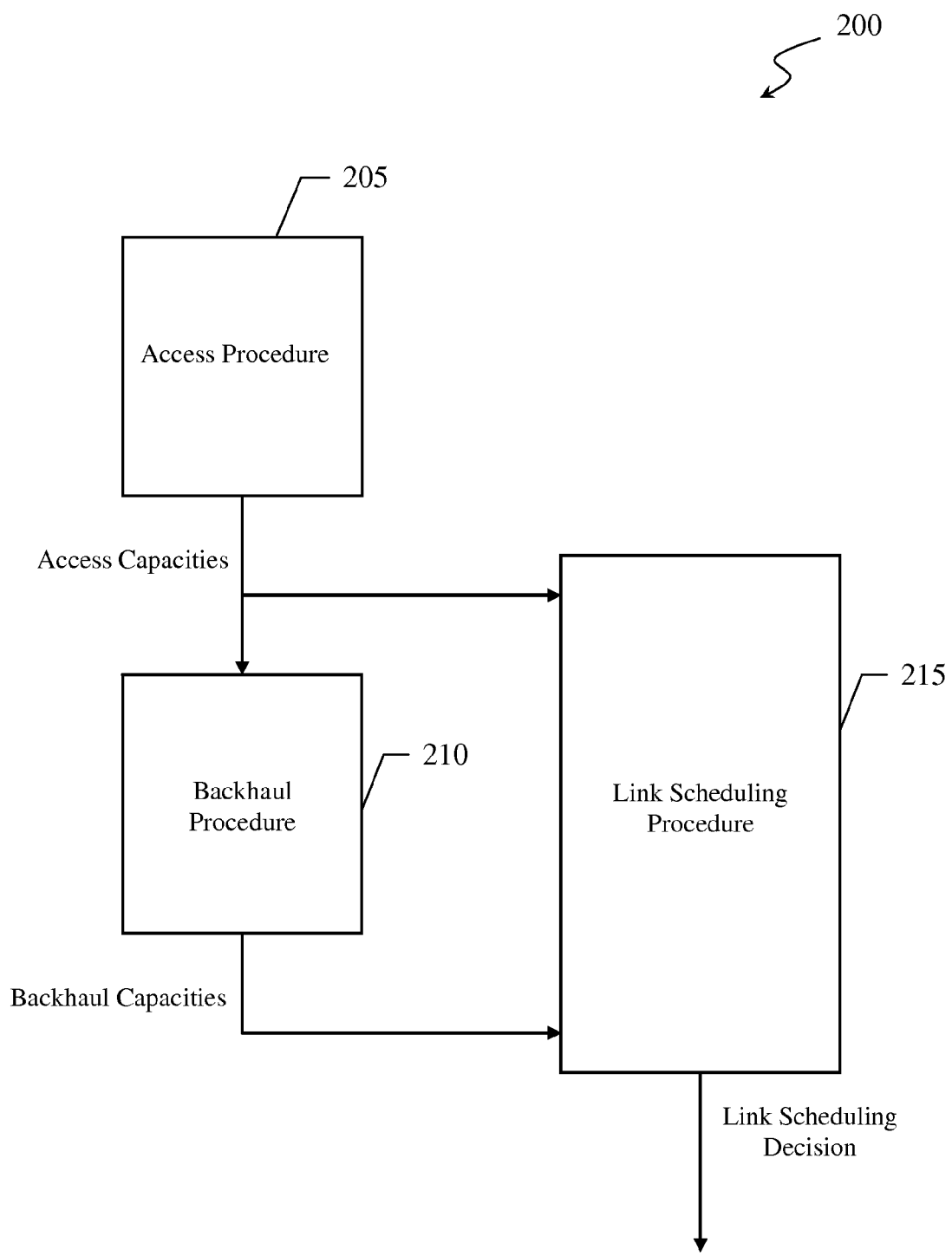
Figure 3:
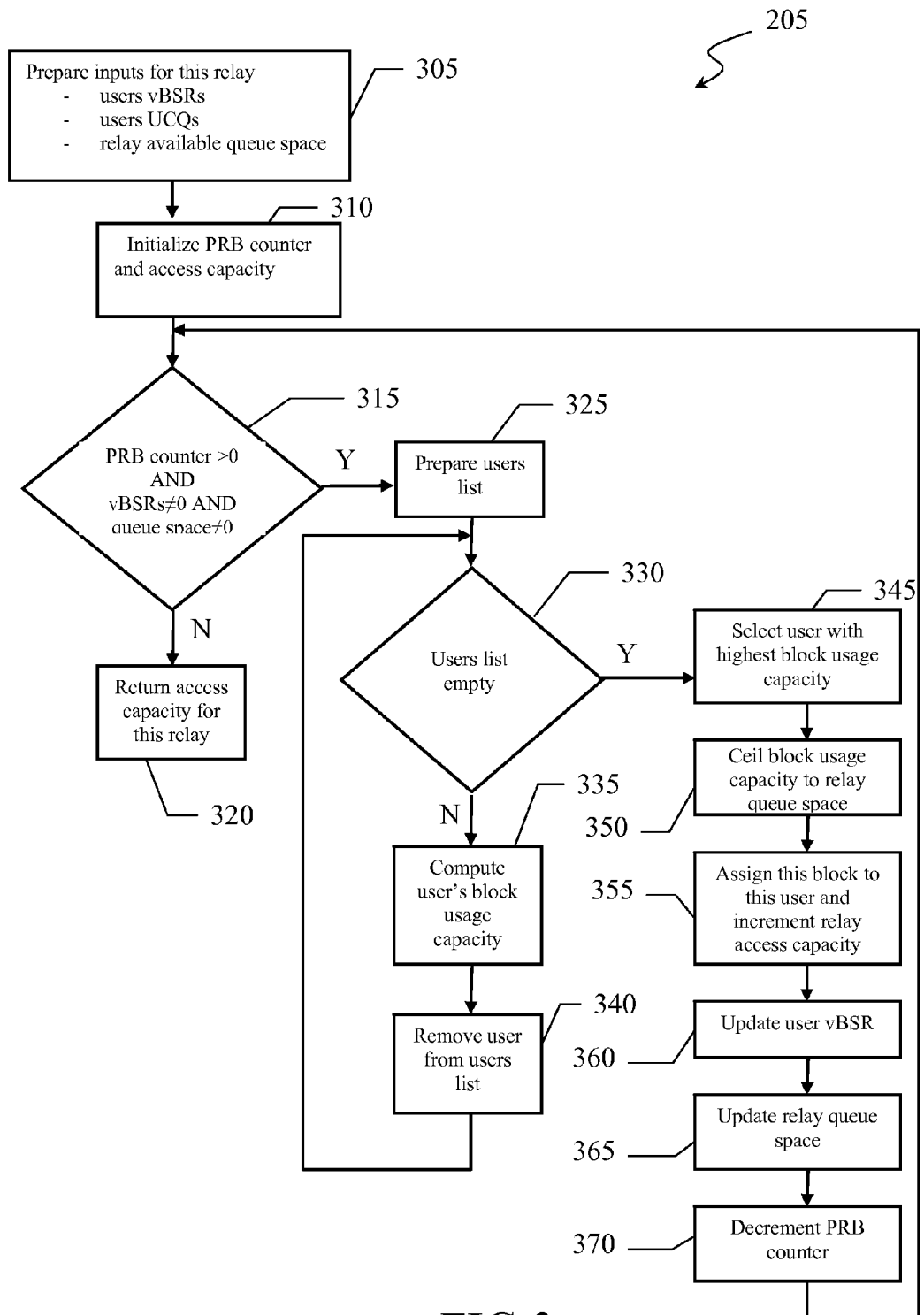
Figure 4:
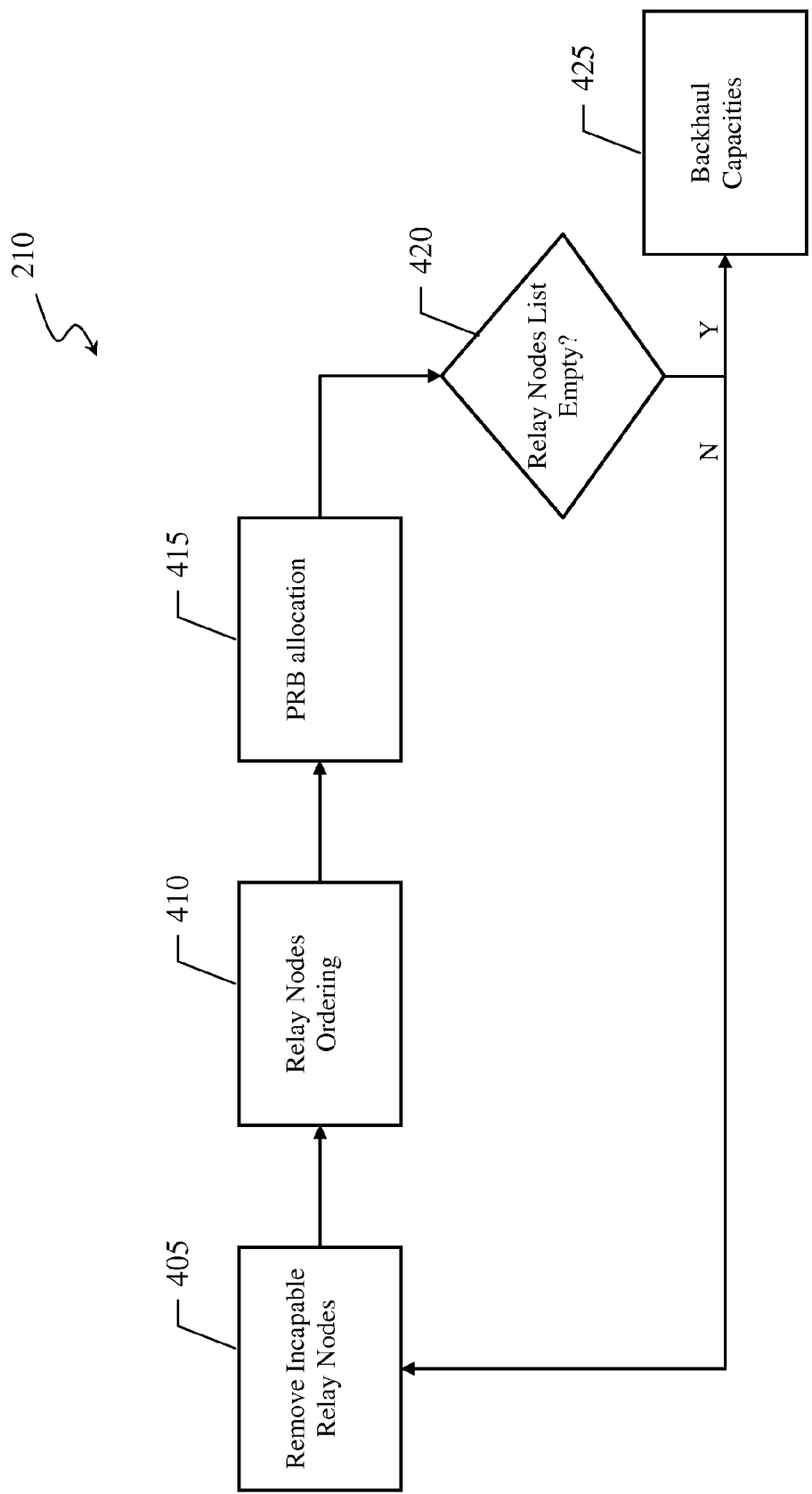
Figure 5:
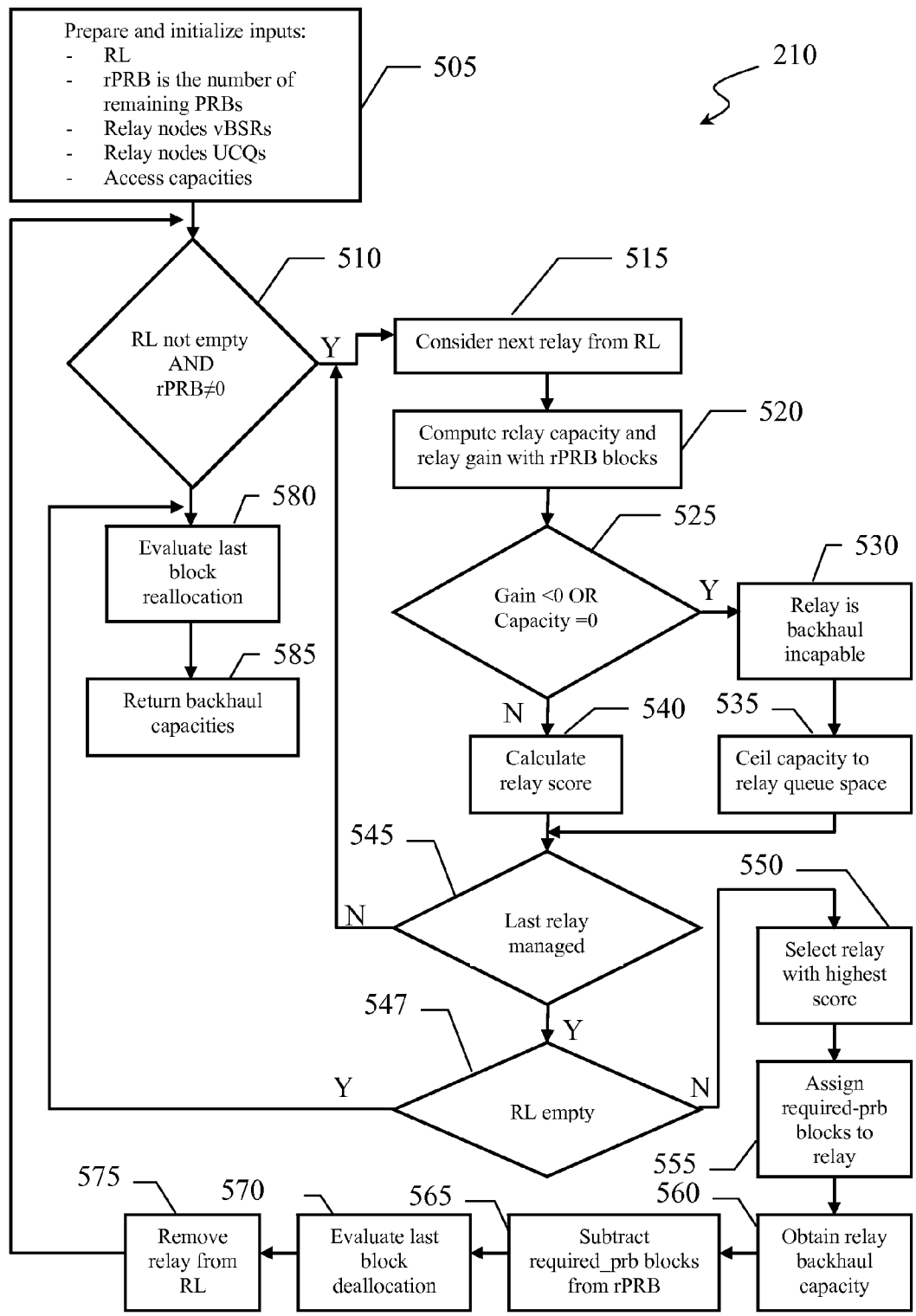
Figure 6:
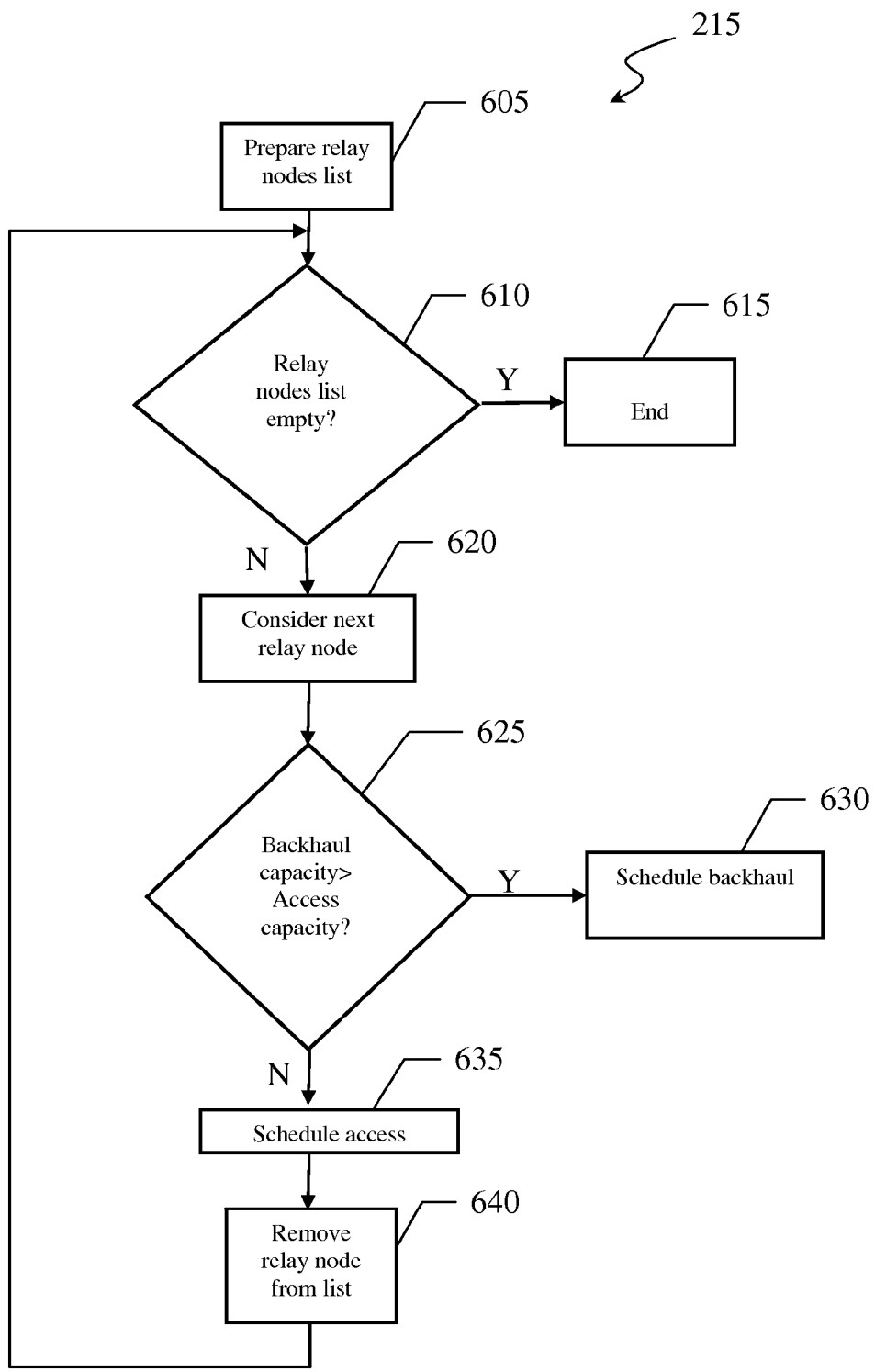

These and other features and advantages of the present invention will be made apparent by the following description of some exemplary and non limitative embodiments thereof; for its better intelligibility, the following description should be read making reference to the attached drawings, wherein:

FIG. 1 schematically shows a wireless communications network portion wherein the solution according to one or more embodiments of the present invention may be applied;

FIG. 2 schematically shows a high-level scheme of a link scheduling algorithm according to an embodiment of the present invention;

FIG. 3 schematically shows a flow chart illustrating a sequence of operations of a first procedure of the link scheduling algorithm according to an embodiment of the present invention;

FIG. 4 schematically shows a high-level flow chart illustrating a sequence of operations of a second procedure of the link scheduling algorithm according to an embodiment of the present invention;

FIG. 5 schematically shows in a more detailed way the flow chart of FIG. 4 according to an embodiment of the present invention, and FIG. 6 schematically shows a flow chart illustrating a sequence of operations of a third procedure of the link scheduling algorithm according to an embodiment of the present invention.

DETAILED DESCRIPTION OF PREFERRED EMBODIMENTS OF THE INVENTION

With reference to the figures, a wireless communications network 100 wherein the solution according to one or more embodiments of the present invention may be applied includes, as schematically shown in FIG. 1, a plurality (only one depicted in the figure) of fixed-location transceiver units, known as donor eNodeB (DeNB), such as the DeNB 105; one or more DeNBs, such as the DeNB 105, provide for radio coverage over a geographic area, also referred to as network cell, such as the network cell 110, for allowing user equipments (UEs) within the network cell (such as the user equipments 115—e.g., mobile phones—within the network cell 110) to receive a required service (e.g., a phone call). In the exemplary but not limiting embodiment described, the wireless communication network 100 is a cellular communication network (or briefly cellular network), compliant with the developing Long Term Evolution (LTE) Advanced of the Third Generation Partnership Project (3GPP) Universal Mobile Telecommunications System (UMTS) protocol, or Release-10 3GPP LTE, wherein the DeNB 105 transmits using an orthogonal frequency division multiplexing (OFDMA) modulation access scheme for downlink transmissions (i.e., from the DeNB 105) and the user equipments 115 perform uplink transmissions (i.e., towards the DeNB 105) using a single carrier frequency division multiple access (SC-FDMA) scheme.

As visible in the figure, the cellular network 100 also includes a plurality (three, in the example at issue) of relay nodes 120 of a known type, i.e., transceiver stations each one generically intended to increase the network capacity of the cellular network 100. More specifically, each relay node 120 is configured for autonomously facilitating communication between some, or all, the UEs 115 within the network cell 110 and the DeNB 105, for example, by independently scheduling communications with the DeNB 105, over a backhaul link (by receiving data over a downlink and transmitting data over an uplink), and with a UE, over an access link (by transmitting data over a downlink and receiving data over an uplink)

In the exemplary but not limiting embodiment disclosed, each relay node 120 represents an intermediate station between the DeNB 105 and a set of UEs 115 (two or three, in the example depicted in the figure) within the network cell 110, so that the cellular network 100 implements a multi-hop system having, in the case at issue, a number of hops equal to two (and hence only one level of relay nodes).

Moreover, for the sake of simplicity, it will be assumed that all UEs 115, although possibly being able to communicate directly with the DeNB 105, communicate with the DeNB 105 only through a corresponding relay node 120.

For the sake of completeness, as well known by those having ordinary skill in the art, the DeNBs, such as the DeNB 105, are generally part of a radio access network (not depicted), which typically includes one or more radio network controllers (not shown) communicably coupled to, and for controlling, respective DeNBs; in turn, the radio access network is generally communicably coupled to one or more core networks (not shown), which may be coupled to other networks, such as Internet and/or public switched telephone networks (not illustrated).

According to an embodiment of the present invention, the DeNB 105 (typically, through a scheduler unit, or scheduler, thereof) and the relay nodes 120 (for example, through an estimation unit thereof) are configured for implementing respective procedures of a link scheduling algorithm aimed to optimize and maximize network cell throughput, and particularly to select the backhaul link for those relay nodes towards which resource allocation would produce the highest possible gain in terms of cell throughput. In fact, as briefly discussed in the introductory portion of the present description, the backhaul sub-frame represents a critical resource for effectively managing the wireless communication networks such as cellular networks, as it is a single, shared sub-frame that supports all transmissions coming from multiple, dedicated access sub-frames for each relay node; therefore, as each relay node 120 connected to the DeNB 105 could serve concurrently a plurality of UEs 115 of the network cell 110, the backhaul sub-frame could represent the bottleneck in the communication network.

Turning now to FIG. 2, the latter schematically shows a high-level scheme of a link scheduling algorithm 200 according to an embodiment of the present invention. As previously discussed, the object of the link scheduling algorithm 200 is throughput maximization of the network cell by properly activating either the backhaul or the access link of the various relay nodes within the network cell, and particularly activating the backhaul link to those relay nodes towards which radio resource allocation would produce the highest possible gain in terms of cell throughput. It should be understood that the term "radio resources" may have specific meaning according to the technology used for the cellular network (for example, the technology used for modulation and coding scheme for implementing transmissions over channels or links); for the cellular network herein exemplarily disclosed, such term should be generically construed as, and thus referred in the following as, radio "Physical Resource Blocks" (PRBs), i.e., groups of elementary resource allocations, such as transport carriers (e.g. sub-carriers), assigned by the DeNB scheduler for data transmission purposes (e.g., a PRB for UMTS LTE may comprise 12 sub-carriers when the sub-carrier bandwidth is 15 kHz or 24 sub-carriers when the sub-carrier bandwidth is 7.5 kHz).

In the disclosed embodiment, for example, at each Transmission Time Interval (or TTI)—e.g., with reference to a dynamic link scheduling approach—, the link scheduling algorithm 200 is run (with a portion thereof that is executed within each relay node and another portion thereof within the DeNB) for making the decision whether to activate the access or backhaul link for each relay; such decision, or link scheduling decision or duplexing decision, is based on the throughput the relay nodes could generate, given the radio resources that such relay nodes could have at their disposal, which in turn depends on the policy with which the radio resources in the backhaul sub-frame are allocated to relay nodes.

More particularly, as visible in the figure, the link scheduling algorithm 200 includes three procedures, namely:

access procedure (block 205); such procedure, implemented within and performed by each relay node, receives as inputs feedback information coming from UEs and indicative of a status of the UEs associated to the relay node, and gathers and aggregates such feedback information into a summarized control information, referred to as access capacity value in the following. The latter will be provided to the DeNB as further input for the following procedures of the link scheduling algorithm 200. In order to provide the required access capacity to the DeNB, a signaling—which is currently not enclosed in the last (release 10) LTE Advanced—is required (e.g. obtained by introducing transmission of new uplink control messages over backhaul sub-frame, by using standard LTE PUCCH and/or PUSCH control channels). As far as feedback information is concerned, they may include uplink and/or downlink feedback information, which can be used alone or in combination to each other for performing the access procedure 205; in the following of the present description, reference will be made, by way of example only, to uplink feedback information (and hence the access capacity to which reference will be made hereinafter is an uplink access capacity). More particularly, the latter relates to buffer status, such as BSR—Buffer Status Report, which is considered in the last (release 10) LTE standard and is transmitted by the UEs to the relay they are associated to. Furthermore, the relay possesses UCQ—Uplink Channel Quality estimation through reference signals;

backhaul procedure (block 210); such procedure, implemented within and performed by the DeNB, receives as inputs:
  i) the access capacity values provided by the access procedure 205 for each relay node afferent to the DeNB, which are sent to the DeNB through whichever available invention. For merely exemplary purposes, it is possible to have the access capacities conveyed through BSR control elements having unused logical channel group identifiers;
  ii) the BSRs of the relay nodes (conveyed as standard feedbacks in release 10 of LTE), and
  iii) the UCQ information for each relay. The backhaul procedure computes the backhaul capacity value for each relay node; and link scheduling procedure (block 215); such procedure, implemented within and performed by the DeNB, receives as inputs the access capacity values and the backhaul capacity values provided by the access procedure 205 and the backhaul procedure 210 respectively, and, based on such values, makes the link scheduling decision of which link, whether the access or the backhaul one, to activate for each relay node.

An operation flow of the access procedure 205 of the link scheduling algorithm according to an embodiment of the present invention is schematically shown in FIG. 3. As previously discussed, the access procedure 205 is the same executed on each relay node, and therefore hereinafter reference will be made to a generic relay node of the cellular network for the sake of simplicity. The access procedure computes how many bytes would be transmitted on the relay's access link if the latter was activated and the UEs were scheduled by the relay node according to an exhaustive Max-Throughput algorithm, which allocates the PRBs of the access sub-frame to the backlogged UE with the best channel quality up to exhaustion of that UE's backlog, or of the PRBs, or of the relay node's available queue space. The access procedure performs this only for the sake of computing the access capacity, and without actually performing resource allocation of PRBs on the access sub-frame, the latter being a task which is not limiting for the present invention.

More specifically, the access procedure 205 of the link scheduling algorithm starts at block 305, wherein the relay node receives, at each TTI, the feedback information coming from the UEs, i.e. the BSR, the latter representing the amount of data queued at the UE. Furthermore, the relay node possess a UCQ parameter for each UE, and knows the available queue space at the relay node itself. More particularly, the UCQ parameter denotes the uplink channel quality measured by the relay nodes (relative to the UEs)—in the present implementation it will be assumed that such measurement is of wideband type and that its value is expressed as the number of bytes allocable for each physical resource block or PRB (i.e., number of sub-carriers, for a predetermined amount of time, allocated for the UEs). A virtual BSR (vBSR) parameter, instead, denotes a variable for each UE, whose initial value is the one reported in the BSR feedback for that UE.

A PRB counter (counting the PRBs to be allocated) is initialized to the number of PRBs present within the access sub-frame (block 310). At this point, the access procedure 205 executes, at the decision block 315, a test for verifying whether there are un-allocated PRBs (i.e., whether the PRB counter is greater than zero), and the vBSR parameter of all the UEs associated to that relay is not null, and the available queue space at the relay is not null.

If there are no un-assigned PRBs, or the vBSRs is null or the relay available queue space is null (exit branch N of the decision block 315), the access procedure 205 returns, at block 320, the access capacity of the relay node (that is obtained, as will be best understood shortly, by the access capacity, updated at each PRB allocation occurring during a corresponding reiteration of a virtual PRB allocation routine, which executed while PRBs are available in the access sub-frame, the vBSR parameter is not null and queue space at the relay node is available).

If instead there are un-assigned PRBs and the vBSRs and the relay available queue space are not null (exit branch Y of the decision block 315), the access procedure 205 implements the virtual PRB allocation routine (blocks 325-370), until the conditions checked at the decision block 315 are verified.

More specifically, the virtual PRB allocation routine, at block 325, prepares a UE list (i.e., all UEs connected to the considered relay node are taken into account) and verifies at the decision block 330 whether such UE list is empty or not. If the UE list is not empty (exit branch N of the decision block 330), then a block usage capacity parameter (also referred to as BUC parameter—with the term block that, as previously discussed, is intended to mean block of radio resources—and denoting the capability of a considered UE of the UE list to use a given PRB assigned thereto, specifically the number of bytes that the considered UE can transmit if using a given PRB assigned thereto) is calculated (block 335) for each UE as the minimum between that UE's UCQ and vBSR parameters. At this point, block 340, the UE whose BUC parameter has just been calculated is removed from the UE list, and the virtual PRB allocation routine returns to the block 330 and executes the same operation of the blocks 330,335, 340 until the UE list results empty.

When the latter condition is verified (exit branch Y of the decision block 330), the virtual PRB allocation routine selects the UE having the maximum BUC parameter (block 345), and the corresponding value is then limited to the available relay node queue space, thereby obtaining the corresponding LBUC—Limited BUC—value (block 350), which is smaller than, or equal to, the BUC parameter. The PRB is then (virtually) allocated to the UE and the LBUC value is added to, for updating, the access capacity value of the relay node (block 355).

Then, the vBSR parameter of the UE is updated too (block 360), by subtracting from it the value of the LBUC parameter, and the space of the queue of the relay node is decremented as well of the same value (block 365). The PRB counter is then decreased by one, since the PRB has been assigned and the PRB counter must be updated accordingly before passing to the next iteration (back to the block 315 from which a new virtual PRB allocation routine 325-370 can take place for the next PRB allocation at the same relay node).

Therefore, the reiteration of the virtual PRB allocation routine 325-370 for a given relay node ends when one of the following conditions occurs, whichever occurs first:
   i) all the PRBs have been assigned, or
   ii) the vBSR of all the UEs associated to that relay is null, or
   iii) the available queue space at the relay becomes null.

At that time, the access procedure 205 computes the relay node access capacity (given by the access capacity value updated during the last reiteration of the virtual PRB allocation routine), block 320. The latter is to be conveyed to the DeNB as a feedback information (which is not defined in the current standard release 10 of LTE Advanced) by the relay node (and so as for each one of the relay nodes connected to the DeNB).

FIG. 4 schematically shows a high-level flow chart illustrating a sequence of operations of the backhaul procedure 210 of the link scheduling algorithm according to an embodiment of the present invention.

The backhaul procedure computes the backhaul capacities for each relay node, i.e. how many bytes would be transmitted on the common backhaul link by each relay if the backhaul link was activated for that relay and all the relay nodes were scheduled by the DeNB according to a score-based procedure (defined hereafter), which virtually allocates the PRBs of the backhaul sub-frame to the backlogged relay node with the highest score up to exhaustion of that relay node's backlog or of the available PRBs. The backhaul procedure performs this only for the sake of computing the backhaul capacities, and without actually performing resource allocation of PRBs on the backhaul sub-frame, the latter being an aspect that is not limiting for the present invention.

More specifically, as visible in the figure, the backhaul procedure 210 starts at block 405, wherein, given the list of the relay nodes to which possibly assign the PRBs (initially all), relay nodes are eliminated that, even if given all remaining, not yet allocated PRBs, would not have a backhaul capacity larger than their access capacity.

Then, the backhaul procedure 210 prosecutes at block 410, by ordering the relay nodes that are in the relay nodes list (thus, not previously eliminated) based on a score parameter (i.e., an indication of the advantage of assigning backhaul radio resources at a certain relay node). The score is obtained by calculating a gain deriving by activating the backhaul link instead of that relay's access link, and dividing the result by the quantity of PRBs necessary for obtaining it (or required PRBs). Then, the PRBs are assigned to the relay node having the highest score (block 415).

The operations above described at the blocks 405, 410 and 415 are repeated until the relay nodes list is empty. Such condition is checked at the decision block 420 of the backhaul procedure 210; more specifically, as long as the relay nodes list is non empty (exit branch N of the decision block 420), the backhaul procedure returns to block 405, and hence to blocks 410, 415 and 420, whereas when the relay nodes list is detected as empty (exit branch Y of the decision block 420), the backhaul procedure 210 outputs at the block 425 a list of backhaul capacities for each relay node, which will be evaluated by the link scheduling procedure for making the link scheduling decision.

FIG. 5 schematically shows in a more detailed way the flow chart of the backhaul procedure 210 according to an embodiment of the present invention.

The backhaul procedure 210 receives as inputs (block 505) the relay nodes BSRs parameters (conveyed as standard feedback in LTE), the relay nodes UCQ parameters (computed at the DeNB), the relay nodes access capacity values (output by the access procedure of each relay node), as well as the number of PRBs of the backhaul sub-frame. The remaining PRBs (also referred to as rPRB parameter) are initialized to the latter number.

In such phase, backhaul capacities values for each relay node are initialized to zero (so that all relay nodes are considered in the backhaul procedure, regardless of their score, as will be best understood in the following).

While the relay node list is non empty and the rPRB parameter is above zero (exit branch Y of the decision block 510), a next relay node of the list is considered (block 515), the relay node maximum capacity and gain are calculated (block 520) assuming that the latter is able to use all the (available) remaining PRBs, i.e., the remaining PRBs whose number is represented by the rPRB parameter. The gain of a given relay node is the difference between the maximum capacity and the access capacity for that relay node. At decision block 525, a test is performed for evaluating, according to the just calculated gain and the maximum capacity values for the presently considered relay node, whether the considered relay node is a "backhaul-capable relay node" or "backhaul-incapable relay node", i.e., it is capable or not of achieving a higher backhaul capacity than its access capacity.

More specifically, if the gain is lower than zero or the maximum capacity is equal to zero, then (exit branch Y of the decision block 525) the relay node is recognized as being a backhaul-incapable relay node (block 530), it is assigned a null backhaul capacity, and it is removed from the relay nodes list (block 535). Otherwise (exit branch Y of the decision block 525), the relay node is deemed as backhaul-capable, and hence the backhaul procedure 210 calculates, at block 540, the score parameter for the backhaul-capable relay node, the score parameter being thus able to provide, as previously introduced, an indication of the advantage deriving from allocation of PRB to the backhaul path of a given backhaul capable relay node with respect to another backhaul capable relay node.

More specifically, the score parameter for the i-th relay node is calculated in the following way:
the maximum capacity (in the following, denoted by $capacity_i$) that would be obtained by serving the i-th relay node with all the remaining PRBs is obtained as:

$$capacity_i = min(vBSR_i, UCQ_i * rPRB),$$

from the maximum capacity $capacity_i$ and the access capacity value (in the following denoted by $access\_capacity_i$), the relay node gain $gain_i$ is computed as:

$$gain_i = capacity_i - access\_capacity_i$$

therefore the score is then obtained by dividing the gain $gain_i$ by the PRBs that would be assigned to the i-th relay node (required PRBi) to obtain it:

$$score_i = gain_i / required\ PRB_i$$

wherein required $PRB_i$ is the number of PRBs that the presently considered relay node would exploit to have the maximum capacity $capacity_i$, and specifically is calculated as the ratio between the capacity $capacity_i$ and the $UCQ_i$ parameter associated with the i-th relay node.

At this point, regardless of whether the relay node is backhaul-capable or backhaul-incapable, the backhaul procedure 210 resumes from either blocks 540 or 535 towards the same operations flux. Specifically another test is executed at the block 545 for verifying whether the just managed relay node is the last one in the relay nodes list. Based on the result of such test, the operations of above are executed, relay node by relay node, for all the subsequent relay nodes of the relay nodes list (in this respect, see arrow connection from the exit branch N of the decision block 545 back to the block 515, indicating that the just managed relay node is not the last one of the relay nodes list).

When all the relay nodes have been subjected to the operations of above, another test can be executed at the decision block 547 for checking if all the relay nodes have been considered as backhaul-incapable relay nodes. In the affirmative case, exit branch Y of the decision block 574, the backhaul procedures continues to the block 580, whereas, on the contrary (exit branch N of the decision block 547), a virtual PRB allocation routine on the backhaul link (blocks 550-575) is executed for virtually assigning PRBs to the backhaul link of each selected backhaul-capable relay node and determining the backhaul capacity for each selected backhaul-capable relay node.

More specifically, the virtual PRB allocation routine on the backhaul link selects, at the block 550, the relay node with the highest score (i.e., the selected relay node is the one, among the backhaul-capable relay nodes, having the highest score), assigns to it the PRBs (block 555) based on which the score thereof was previously calculated (i.e., the number required $PRB_i$ of PRBs of the sub-frame, for a backhaul capacity equal to the maximum capacity $capacity_i$), and thus obtains the relay node backhaul capacity (block 560).

The number of assigned PRBs is then subtracted by the rPRB parameter (block 565), and the i-th relay is removed from the relay nodes list (block 575), and the procedures goes back to the block 510.

During the virtual PRB allocation to a relay node, the last assigned PRB may be exploited partially (i.e., also include padding besides data). If that last PRB is evaluated as being non necessary (i.e., the relay node would still have a backhaul capacity higher than its access capacity), it is revoked (block 570) and put into a temporary list of unassigned PRBs to be possibly assigned later on. If, at the end of the backhaul procedure 210, un-assigned PRBs still exist (exit branch N of the decision block 510), a last re-assignment step can be provided (block 580) before providing in output the backhaul capacities of the relay nodes (block 585). This last reassignment step takes place as follows: for each remaining PRB, the relay node that might have transmitted on that PRB the highest amount of bytes is assigned that PRB.

It should be noted that the decision block 547 is not strictly necessary, since, if all the relay nodes has been deemed as backhaul-incapable relay nodes, no relay node having maximum score exists to be selected at the block 550; therefore, the operations executed at the blocks 550-575 would have no effect and when the backhaul procedure goes back to the block 510, being at that time the relay node list empty, the operation flow would still continue on block 580.

Summarizing, the backhaul procedure iterates through all the relay nodes. At each iteration, those relay nodes whose backhaul capacity cannot be higher than their access one (backhaul-incapable relay nodes), even if the whole remaining PRBs were allocated to them, are removed from the relay nodes list. Then the backhaul-capable relay nodes in that list are ordered by score and PRBs are assigned to the backhaul-capable relay node with the highest score, which will be subsequently removed from relay node list. In order to reduce the occurrence of padding, the last assigned PRB is revoked to a relay node if, even without it, its backhaul capacity would still be higher than its access capacity. At the end of the procedure then, if some PRBs are still available, they are assigned to those backhaul-capable relay nodes who had been revoked before. A list containing the residual amount of bytes that were not transmitted due to revocation of the last PRB, is kept to perform a (possible) final assignment, and PRBs are assigned in decreasing order of said amount of bytes. This process is repeated until the relay nodes list is empty or no backhaul PRBs are available.

It should be noted that, by initializing at zero the backhaul capacity of each relay node (as mentioned before), the backhaul procedure 210 does not omit the backhaul capacity values (equal to zero) of the relay nodes that have been deemed as backhaul-incapable relay nodes and of the relay nodes that, having a low score, have not been in a condition to be (virtually) assigned the remaining PRBs before the latter are depleted.

FIG. 6 schematically shows a flow chart illustrating a sequence of operations of the link scheduling procedure 215 of the link scheduling algorithm according to an embodiment of the present invention. This is the final procedure of the link scheduling algorithm, in which the DeNB makes the link scheduling decision. Generally, for each relay node, the access capacity and backhaul capacity thereof are compared to each other and the (access or backhaul) link with the highest capacity is activated.

More particularly, with reference to the flow chart of the figure, during the link scheduling procedure 205, a relay nodes list is first prepared (block 605). Then, for each relay node of the list, comparison operations are carried out relay node after relay node until the list is found to be empty. This last test is performed at the decision block 610, wherein the link scheduling procedure checks whether the relay nodes list is empty or not; if the relay nodes list results empty (exit branch Y of the decision block 610), then the link scheduling procedure terminates. If, instead, the relay nodes list is not empty (exit branch N of the decision block 610), then the link scheduling procedure 215 considers the next relay node of the relay nodes list (block 620), performs a comparison (decision block 625) between the backhaul capacity of the considered relay node and the access capacity thereof (with both the access and backhaul capacities being provided by the previous access and backhaul procedures). If the backhaul capacity of the relay node is greater than the access capacity of the same relay node (exit branch Y of the decision block 625), then the link scheduling procedure 215 schedules the backhaul link as the one to be activated (block 630); otherwise (exit branch N of the decision block 625), corresponding to the fact that the access capacity is greater than (or equal to) the backhaul capacity, then the link scheduling procedure 215 schedules the access link as the one to be activated (block 635). In both cases, i.e., regardless of whether the access link or backhaul link is scheduled for a relay node, the relay node is finally removed from the relay nodes list (block 640), and hence the link scheduling procedures 215 moves to considering the next relay node of the relay nodes list, if one such node exists (connection to the decision block 610), so that the link scheduling procedures iterates through all the remaining relay nodes.

As explained above, for the above description of the invention it has been assumed by way of simplification that the UEs are never directly connected to the DeNB, being instead connected to the relay nodes; this assumption has merely the purpose of simplifying the description and is not to be considered as a limitation of the present invention. In fact, it should be understood that the UEs that are directly connected to the DeNB can be regarded, for the purposes of the procedure here described, as "virtual relay nodes" with a constantly null access capacity, and incorporated as such in the backhaul and link scheduling procedures. As a consequence of the above procedure, their link to the DeNB (which is, in fact, the backhaul link) will always be activated by the link scheduling procedure.

As should be easily understood, the link scheduling algorithm of above involves a dynamic approach, as duplexing decision (i.e., the decision of activating, for each relay node, the access path or the backhaul path) are based on a time resolution of each sub-frame, corresponding to 1 TTI. However, this should not be construed in a limitative way, since the link scheduling algorithm may also be implemented according to a semi-static approach, e.g., by executing the link scheduling algorithm at each refresh interval (i.e., the predetermined time interval at which link scheduling decisions are updated, possibly much longer than the TTI) including a respective group of consecutive sub-frames. For example, this can be achieved by using as inputs to the link scheduling algorithm aggregated data related to the entire last refresh interval (i.e., the one just expired), so as to determine the link scheduling patterns for each relay node, to be used in the next refresh interval. More specifically, in order to obtain this, for the computation of the access capacities for each UE, a vBSR parameter equal to the sum of all BSRs received by the relay node (relative to that UE) during the refresh interval, and a UCQ parameter equal to the average value of all the UCQ parameters measured during the refresh interval can be used. Similarly, for the computation of the backhaul capacities, for each relay node, a vBSR parameter equal to the sum of all PRBs received by the DeNB relative to that relay node during the refresh interval, and a UCQ parameter equal to the average value of all the UCQ parameters measured during the refresh interval can be used.

This way, a number of virtual executions (equal to the number of TTIs in the refresh interval) of the link scheduling algorithm can be run for making the link scheduling decision to be applied to the next refresh interval (the output of each virtual execution is used for calculating the input for the next one).

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

Moreover, although the present link scheduling algorithm has been described as having as inputs uplink feedback information, this should not be understood in a restricting way. In fact, the link scheduling algorithm according to the invention may be equivalently applied for downlink feedback information; in this respect, in an alternative embodiment, not shown, said feedback information from the UEs to the relay nodes (as well as from the relay nodes to the DeNB) may include a downlink channel quality parameter denoting the downlink channel quality, whereas the equivalent of the BSR, i.e. the information on the length of the queue of the UEs and of the relay nodes, would already be available at the relay and at the DeNB respectively. Therefore, the corresponding access capacity (that in the present description has been assumed as an uplink access capacity because of the uplink feedback information from which it is derived) is, in such alternative embodiment, a downlink access capacity, which can be calculated by using the downlink channel quality parameters for the access link and downlink queue length information on each relay node. Similarly, the corresponding downlink backhaul capacity computed by the DeNB would be based on the downlink channel quality information fed back by the relay nodes (in lieu of their UCQ), and on the status of the downlink queues at the DeNB (in lieu of the BSRs).

In such alternative embodiment, the BUC parameter for the UE can be calculated as the minimum between the uplink channel quality parameter and buffer status information indicative of the status of the downlink queues at the DeNB, whereas the maximum relay node capacity can be calculated as the minimum between such buffer status information and the product of the downlink channel quality parameter and the remaining physical resource blocks.

Moreover, nothing prevents from implementing the link scheduling algorithm in such a way that the link scheduling decision is based on both uplink and downlink feedback information, or any combination thereof.

In addition, analogous considerations apply if the wireless communication network has a different structure or includes equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although for the present invention explicit reference has been made to wireless communication network based on the LTE-Advanced standard, it should be understood that it is not in the intentions of the Applicant to be limited to the implementation of any particular wireless communication system architecture or protocol. In this respect, it is also possible to provide that, with suitable simple modifications, the present link scheduling algorithm may be applied also to other open or proprietary communication protocols, for example, WiMAX, among them.

The invention claimed is:

1. A method for scheduling link activations within a wireless communications network including at least one network cell, the at least one network cell comprising a base station providing radio coverage over the network cell and at least one relay node for putting the base station into communication with at least one corresponding user equipment within the network cell, said at least one relay node communicating with the user equipment over an access link and communicating with the base station over a backhaul link, the method including:
   estimating, for the at least one relay node, an access link capacity according to status information indicative of a status of the user equipment associated with the relay node;
   estimating a backhaul link capacity of the at least one relay node based on the status information and a maximum capacity of the backhaul link for the at least one relay node, and
   scheduling, for the at least one relay node, either a backhaul link activation or an access link activation such that either one of the backhaul link and the access link is activated, in a predetermined time interval, based on a comparison between the access link capacity and the backhaul link capacity.

2. The method according to claim 1, wherein the step of estimating, for the at least one relay node, an access link capacity comprises virtually assigning, on the access link, physical resource blocks to the user equipment associated with the relay node, and iterating said virtually assigning on the access link for each physical resource block to be assigned, said virtually assigning on the access link comprising, for each iteration:
   calculating, for the user equipment, a block usage capacity parameter indicative of a capability of the user equipment to use a given physical resource block assigned thereto;
   in case more than one user equipment is associated with the relay node, selecting a user equipment having maximum block usage capacity parameter;
   limiting the block usage capacity parameter of the selected user equipment to an available relay node queue space, thereby obtaining a limited block usage capacity parameter being lower than, or equal to, the block usage capacity parameter of the selected user equipment;
   assigning the physical resource block to the selected user equipment, and
   updating the access link capacity of the relay node according to the assigned physical resource block.

3. The method according to claim 2, wherein, for each iteration successive to the first one, the access link capacity of the at least one relay node is given by the access link capacity updated during a last iteration of said virtually assigning physical resource blocks on the access link.

4. The method according to claim 2, wherein the block usage capacity parameter for the at least one user equipment is calculated as the minimum between a channel quality parameter and a buffer status information.

5. The method according to claim 4, wherein the step of evaluating backhaul-capable relay nodes further includes:

considering a buffer status parameter and the access link capacity of the at least one relay node;

calculating, for the at least one relay node, the maximum relay node capacity as the minimum between the buffer status parameter and the product of the channel quality parameter and the remaining physical resource blocks, calculating the gain of the at least one relay node as difference between the maximum capacity of the relay node and the access link capacity for the relay node.

6. The method according to claim 4, wherein the access link capacity is an uplink access link capacity, said channel quality parameter being an uplink channel quality parameter denoting an uplink channel quality evaluated by the relay node in respect of the at least one user equipment associated therewith and by the base station in respect of the relay node, said buffer status information being a buffer status report information, and wherein the status information include the uplink channel quality parameter, the buffer status report information and a relay node available queue space parameter.

7. The method according to claim 4, wherein the access link capacity is a downlink access link capacity, said channel quality parameter being a feedback downlink channel quality parameter denoting a downlink channel quality, wherein the status information include the downlink channel quality parameter and a downlink queues length information, the access link capacity being calculated by using the downlink channel quality parameters for the access links and downlink queues length information on the at least one relay node.

8. The method according to claim 1, wherein the step of estimating a backhaul link capacity of the at least one relay node further comprises virtually assigning on the backhaul link, physical block resources of the at least one relay node, and wherein, in case more than one relay node is present, said virtually assigning on the backhaul link is iterated on each relay node until all physical resource blocks have been virtually assigned to relay nodes or until all the relay nodes have been considered, each iteration including:

evaluating backhaul-capable relay nodes as relay nodes that would be capable of achieving a backhaul link capacity higher than the respective access link capacity;

calculating, for each given backhaul-capable relay node, a score parameter indicative of an advantage deriving from allocating currently available physical resource blocks to said given backhaul-capable relay node with respect to another backhaul-capable relay node;

selecting a backhaul-capable relay node having the greatest score parameter, and virtually assigning required physical resource blocks to said selected backhaul-capable relay node, said required physical resource blocks representing an amount of physical resource blocks able to achieve a maximum capacity for that selected backhaul-capable relay node, and obtaining the backhaul link capacity of the selected backhaul capable relay node based on the assigned required physical resource blocks, the backhaul-capable relay node selected at a given iteration being no longer taken into account in the successive iterations.

9. The method according to claim 8, wherein the step of evaluating backhaul-capable relay nodes further includes, for each relay node:

calculating the maximum capacity as the capacity that would be obtained by assigning to the relay node all remaining physical resource blocks;

calculating a gain as a difference between the maximum capacity of the relay node and the respective access link capacity, and evaluating as backhaul-capable relay nodes those relay nodes whose gain is non negative.

10. The method according to claim 9, wherein said virtually assigning on the backhaul link further includes, after obtaining the backhaul link capacity of the selected backhaul-capable relay node:

updating a value of the remaining physical resource blocks by subtracting a value corresponding to the assigned required physical resource block from the value of the remaining physical resource blocks, and revoking the last assigned required physical resource block from the corresponding selected backhaul-capable relay node if the condition of having the backhaul link capacity higher than the access link capacity is still verified for the relay node.

11. The method according to claim 10, wherein the step of calculating backhaul link capacity of each backhaul-capable relay node further includes, after completing said virtually assigning on the backhaul link:

evaluating a presence of revoked physical resource blocks, and assigning the revoked physical resource blocks to the backhaul-capable relay nodes from which the required physical resource blocks were revoked.

12. The method according to claim 8, wherein the score parameter for each backhaul-capable relay node is obtained by dividing a gain by the required physical resource blocks necessary for obtaining the gain.

13. The method according to claim 1, wherein the step of scheduling, for the at least one relay node, either the backhaul link activation or the access link activation further comprises:

comparing the backhaul link capacity to the access link capacity of the at least one relay node;

scheduling the backhaul link activation if the backhaul link capacity is greater than the access link capacity, or vice-versa.

14. A non-transitory computer readable medium including a computer executable program loadable into at least one internal memory of a computer system with input units and output units as well as with processing units, the computer program comprising executable software adapted to carry out the method phases according to claim 1, alone or in combination, when running in the computer system.

15. A wireless communications network including at least one network cell, the at least one network cell comprising a base station providing radio coverage over the network cell and at least one relay node for putting into communication the base station with at least one corresponding user equipment within the network cell, said at least one relay node communicating with the user equipment over an access link and with the base station over a backhaul link, wherein the at least one relay node includes an estimation unit for estimating, for the at least one relay node, an access link capacity according to status information indicative of a status of the user equipment associated with the relay node, and in that the base station includes a scheduler unit for estimating a backhaul link capacity of the at least one relay node according to the status information and a maximum capacity of the backhaul link for the at least one relay node, and scheduling, for the at least one relay node, either a backhaul link activation or an access link activation such that either one of the backhaul link and the access link is activated, in a predetermined time interval, is activated based on a comparison between the access link capacity and the backhaul link capacity.

* * * * *